(12) United States Patent
Ma et al.

(10) Patent No.: US 12,547,805 B2
(45) Date of Patent: Feb. 10, 2026

(54) METHOD OF RF ANALOG CIRCUITS ELECTRONIC DESIGN AUTOMATION BASED ON GCN AND DEEP REINFORCEMENT LEARNING

(71) Applicant: Mitsubishi Electric Research Laboratories, Inc., Cambridge, MA (US)

(72) Inventors: Rui Ma, Cambridge, MA (US); Mouhacine Benosman, Cambridge, MA (US); Weidong Cao, Cambridge, MA (US)

(73) Assignee: Mitsubishi Electric Research Laboratories, Inc.

( * ) Notice: Subject to any disclaimer, the term of this patent is extended or adjusted under 35 U.S.C. 154(b) by 803 days.

(21) Appl. No.: 17/653,880

(22) Filed: Mar. 8, 2022

(65) Prior Publication Data
US 2023/0267250 A1    Aug. 24, 2023

Related U.S. Application Data

(60) Provisional application No. 63/268,433, filed on Feb. 24, 2022.

(51) Int. Cl.
*G06F 30/27* (2020.01)
*G06F 30/323* (2020.01)
(Continued)

(52) U.S. Cl.
CPC ........... *G06F 30/323* (2020.01); *G06N 3/045* (2023.01); *G06N 3/08* (2013.01)

(58) Field of Classification Search
CPC ............... G06F 30/323; G06F 2117/12; G06F 2119/06; G06F 30/27; G06F 30/373;
(Continued)

(56) References Cited

U.S. PATENT DOCUMENTS

| | | | |
|---|---|---|---|
| 2004/0064296 A1* | 4/2004 | Saxena | G06F 30/367 703/2 |
| 2014/0173537 A1* | 6/2014 | Mohanty | G06F 30/327 716/103 |

(Continued)

OTHER PUBLICATIONS

Settaluri et al., (AutoCkt: Deep Reinforcement Learning of Analog Circuit Designs, IEEE, 2020, pp. 490-495) (Year: 2020).*

(Continued)

*Primary Examiner* — Nghia M Doan
(74) *Attorney, Agent, or Firm* — Gene Vinokur

(57) ABSTRACT

A computer-implemented method is provided for generating device parameters of circuits using a pretrained reinforcement learning (RL) agent composed of a graph neural network (GNN) and a fully connected neural network (FCNN). The method is performed by steps including acquiring inputs with respect to a set of desired specifications or one desired specification of a circuit, device parameters, a fixed topology of the circuit and providing the inputs to the RL agent. The desired circuit description includes a graph modeling the topology of the circuit and device parameters of the circuit, and the desired specifications include gain, bandwidth, phase margin, power consumption, output power and power efficiency. The pretrained RL agent performs steps including transmitting an action selected from a set of actions to an environment module, updating the device parameters of the circuit according to the selected action using a data processor of the environment module, obtaining a current specification of the circuit by simulating a netlist of the circuit, acquiring a reward from the environment module, and generating the updated device parameters of the circuit.

12 Claims, 12 Drawing Sheets

(51) Int. Cl.
*G06F 30/373* (2020.01)
*G06N 3/045* (2023.01)
*G06N 3/08* (2023.01)
*G06N 3/092* (2023.01)
*G06N 20/00* (2019.01)

(58) Field of Classification Search
CPC .......... G06N 3/045; G06N 3/08; G06N 3/006; G06N 3/0464; G06N 3/065; G06N 3/09; G06N 3/092; G06N 20/00
See application file for complete search history.

(56) References Cited

U.S. PATENT DOCUMENTS

| 2022/0138570 A1* | 5/2022 | Tsai | G06N 3/08 706/25 |
| 2022/0266145 A1* | 8/2022 | Gisslén | G06N 3/08 |

OTHER PUBLICATIONS

Wang et al., (GCN-RL Circuit Designer: Transferable Transistor Sizing with Graph Neural Networks and Reinforcement Learning, DAC, 2020, pp. 1-6 (Year: 2020).*
Settaluri Keertana et al. "AutoCKT Deep Reinforcement Learning of Analog Circuit Designs," Proceeding of the Conference & Exhibition of Design, Automation & Test in Europe, Mar. 9, 2020, pp. 490-495.
Li Yaguang et al. "A circuit attention network based actor critic learning approach to robust analog transistor sizing," Proceedings of the ACM IEEE 3rd workshop on machine learning for CAD. Aug. 30, 2021, pp. 1-6.
Wang Hanrui et al. "GCN-RL Circuit Designer: Transferable Transistor Sizing with Graph Neural Networks and Reinforcement Learning," Proceedings of the 57th ACM IEEE Design Automation Conference, Jul. 20, 2020, pp. 1-6.
Zhao Zhenxin et al. "Deep Reinformcement Learning for Analog Circuit Sizing," Proceedings of the IEEE International Symposium on Circuits and Systems, Oct. 12, 2020, pp. 1-5.

* cited by examiner

| Circuit types | Two-stage Op-Amp | | | | RF Polar-TX | | |
|---|---|---|---|---|---|---|---|
| Implementation technology | 45 nm CMOS | | | | 150 nm GaN | | |
| # of device parameters | $2 \cdot 7 + 1 = 15$ | | | | $2 \cdot 7 = 14$ | | |
| Parameter constraints | Width ($\mu m$) [1, 100] | # of fingers [2, 32] | capacitance ($pF$) [0.1, 10] | | Width ($\mu m$) [16, 100] | # of fingers 1, 2, 4, ..., 16 | |
| Desired specifications (Sampling space) | Gain ($G$) [300, 500] | Bandwidth ($B$) [$10^6$, $2.5 \cdot 10^7$] Hz | Phase margin ($PM$) [55°, 60°] | Power consumption ($P$) [$10^{-4}$, $10^{-3}$] W | Power efficiency ($E$) [50%, 60%] | Output power ($P$) [2, 3] W | |

FIG. 3B

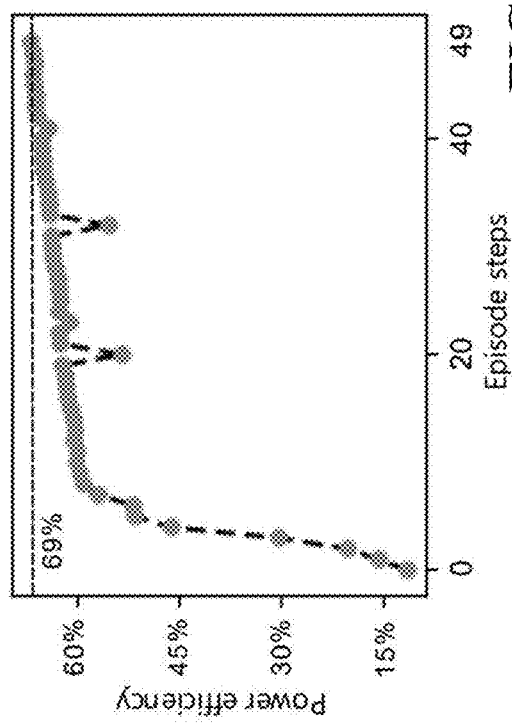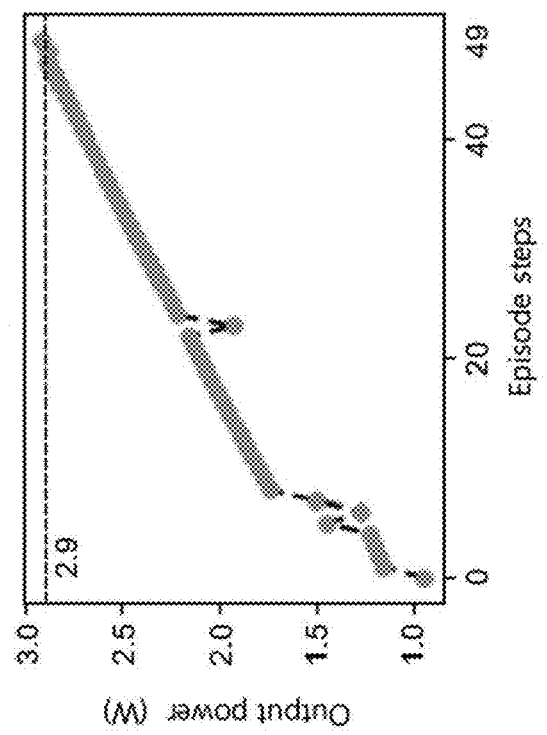
FIG. 9A
FIG. 9B

| Methods | Mean # of design steps | | Generality |
|---|---|---|---|
| | Two-stage Op-Amp | RF polar-TX | |
| Bayesian Optimization [4] | 105 | 86 | × |
| FCNN-based policy network [9] | 25 | 22 | × |
| GNN-FC-based policy network | 20 | 17 | ✓ |

FIG. 10

METHOD OF RF ANALOG CIRCUITS ELECTRONIC DESIGN AUTOMATION BASED ON GCN AND DEEP REINFORCEMENT LEARNING

The present invention is generally related to analog circuits design, and in particular to radio frequency circuits design automation techniques.

BACKGROUND

Analog circuits are the key to bridging our physical world and modern digital information world. Unlike digital circuits following standard time-efficient flows enabled by Electronic Design Automation tools, analog circuits require onerous human efforts and lack effective design automation techniques at all stages.

Pre-layout design of analog circuits can be represented as a parameter-to-specification (P2S) optimization problem, whose goal is to find optimal device parameters (e.g., width and finger number of transistors) to meet desired specifications (e.g., power and bandwidth) based on a selected circuit topology. Such a problem is very challenging. First, it involves searching for optimum parameters of diverse devices in a huge design space. The complexity grows exponentially when the number of design parameters and desired specifications are increased. Second, the practical interrelations between device parameters and circuit specifications are complicated, depending on multiple factors, such as topologies of circuits and couplings of specifications. There are no accurate rules to follow, worsening the search process. Conventionally, human designers have to manually derive device parameters from circuits with their experience and knowledge. However, hand-crafting empirical equations is burdensome and the derived parameters are often not immediately reliable due to simplified physical models of devices and circuits, leading to tens and even hundreds of iterations to ensure the design accuracy.

Accordingly, there is a need to develop a design automation technique for analog circuit/RF circuit design to facilitate the design procedure and shorten the time-to-market.

SUMMARY OF THE INVENTION

Some embodiments of the present invention are based on recognition that the automated design of analog circuits is a longstanding challenge in the integrated circuit field. The embodiments provide a deep reinforcement learning (RL) framework to assist the design of analog circuits at the pre-layout level, where the goal is to find device parameters to fulfill desired specifications. Unlike all prior methods, our approach incorporates important domain knowledge that determines the relations between device parameters and circuit specifications, achieving state-of-the-art design accuracy and efficiency. It is applicable for designing various analog circuits (e.g., radio-frequency circuits) with different semiconductor technologies, breaking the limitations of prior arts in designing a narrow scope of low-frequency analog circuits with conventional semiconductor technology. To enable such abilities, we tailor a policy network for our RL agent by properly combining a circuit-topology-based graph neural network (GNN) and a fully connected neural network (FCNN). The proposed policy network can effectively capture the common physical features (e.g., device's parameters and interactions) present in a circuit graph with the GNN and extract the couplings (e.g., design trade-offs) of specifications with the FCNN, thereby best modeling the relations between circuit parameters and design targets. Experimental results show that our method achieves 97.5% accuracy for the design of exemplary circuits with 1.5 efficiency of existing best-performing methods. Our method also demonstrates superior generalization and transferability.

Further, some embodiments are based on recognition that Machine learning (ML) techniques, such as supervised learning and reinforcement learning, have recently been used as automated methods to improve the design efficiency of analog circuits. By training neural network models, ML methods can cover a huge design space and achieve design goals with much less iterations. Despite their great promise, existing best-performing ML approaches treat the P2S optimization as a black box without considering practical yet very important interrelations between device parameters and circuit specifications, severely limiting their robustness, accuracy, and efficiency. Additionally, these ML methods are confined to a very narrow scope of low-frequency analog circuits (i.e., operational-amplifiers) implemented with conventional complementary metal-oxide-semiconductor (CMOS) technology. They are not readily applicable to other types of analog circuits designed with different semiconductor technologies.

Here, the present invention can provide a reinforcement learning (RL) method for the P2S optimization, where a well-trained RL agent can autonomously figure out optimal device parameters for desired specifications. Unlike all prior arts, our approach incorporates the domain knowledge that determines the relations between device parameters and circuit specifications, thereby achieving the highest design accuracy (97.5%) and efficiency (1.5 of the state of the arts). For a few failed cases, the decision sequence of the RL agent can still provide hints to warm start a manual tuning method to ensure 100% design accuracy. Our agent can also generate optimal device parameters for unseen desired specifications. Its great ability is enabled by the tailored policy network composed of a graph neural network (GNN) and a fully connected neural network (FCNN). The GNN is built upon the topology of a given circuit, which can capture the underlying physics of the circuit, e.g., device's parameters, connections, and interactions. The FCNN extracts the couplings of circuit specifications. With such a unique policy network, our RL agent can include adequate information of the circuit into loop and make optimal sequential decisions like an experienced human designer to update device parameters, realizing high-quality automated design of analog circuits.

Our method also breaks the limitations of prior arts in only designing low-frequency analog circuits with conventional complementary metal-oxide-semiconductor (CMOS) technology. The method exploits common physical features of devices across a wide range of semiconductor technologies to encode their states such it can design various analog circuits with different semiconductor technologies. Particularly, it can be used to design radio-frequency (RF) circuits in gallium nitride (GaN) technology—a promising alternative for conventional CMOS technology and for high-frequency and power electronic applications. RF circuits are a subclass of analog circuits that specially deal with high-frequency signals and demand more sophisticated analyses and electromagnetic characterizations, in addition to the design challenges faced by low-frequency analog circuits. Our approach can leverage a fast reward signal to significantly shorten the training time and accelerate the design of RF circuits during the deployment stage. Our work shows that the RL method combined with domain knowledge has the potential to bring us closer to a future in which circuit designers are assisted by artificial agents with massive circuitry optimization experiences.

Some embodiments of the present invention present a deep RL framework capable of automatically designing both low-frequency and RF analog circuits in different implementation technologies, i.e., CMOS and GaN. Previous works either use supervised learning or focus on designing a narrow scope of low-frequency analog circuits in CMOS technology.

Further, some embodiments are based on recognition that a policy network architecture is configured by properly combining GNNs and FCNNs for the RL agent. This policy network can comprehensively refine the complicated relations between device parameters and circuit specifications. The agent can thus achieve faster and better optimization of the circuits.

Yet, further, some embodiments of the preset invention are recognition that the proposed RL framework has the ability to generalize, meaning that the trained RL agent can leverage the previously learned experiences to optimize device parameters for new unseen design specifications. Previous works are lack of such generality.

An embodiment shows that the trained RL agent achieves state-of-the-art 97.5% accuracy to obtain the optimal device parameters for randomly given design specifications during the deployment stage. For a very few failed cases, the decision sequence of the RL agent can still provide hints to warm start a manual tuning method.

According to some embodiments of the present invention, a computer-implemented method is provided for generating device parameters of circuits using a pretrained reinforcement learning (RL) agent composed of a graph neural network (GNN) and a fully connected neural network (FCNN), wherein the method uses a processor coupled with a memory storing instructions implementing the method, wherein the instructions, when executed by the processor, carry out at steps of the method, including: acquiring, via an interface, inputs with respect to a set of desired specifications or one desired specification of a circuit, device parameters, a fixed topology of the circuit and providing the inputs to the RL agent, wherein the desired circuit description includes a graph modeling the topology of the circuit and device parameters of the circuit, wherein the desired specifications include gain, bandwidth, phase margin, power consumption, output power and power efficiency, wherein the pretrained RL agent is configured to perform steps of: transmitting an action selected from a set of actions to an environment module; updating the device parameters of the circuit with respect to a circuit desired specification according to the selected action using a data processor of the environment module, wherein the action changes each of current device parameters by a minimum unit value of each device parameter; obtaining a current specification of the circuit by simulating a netlist of the circuit based on the updated device parameters using a circuit simulator of the environment module, wherein the environment module includes the netlist of the circuit; acquiring a reward from the environment module, wherein the reward is computed based on a difference between the current specification and the desired specification, wherein the steps of the transmitting, updating, obtaining and acquiring are continued until the reward reaches to a threshold value or a number of steps reach a preset value; and generating the updated device parameters of the circuit.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 3B shows the design space of device parameters and sampling space of desired specifications of two benchmarks, according to embodiments of the present invention;

FIGS. 9A and 9B show generalization examples of the trained RL agent attempting to reach one group of the unseen new specifications for one circuit in design, according to embodiments of the present invention;

FIG. 10 shows the comparison of different design automation methods, according to embodiments of the present invention.

DETAILED DESCRIPTION

Figure 1:
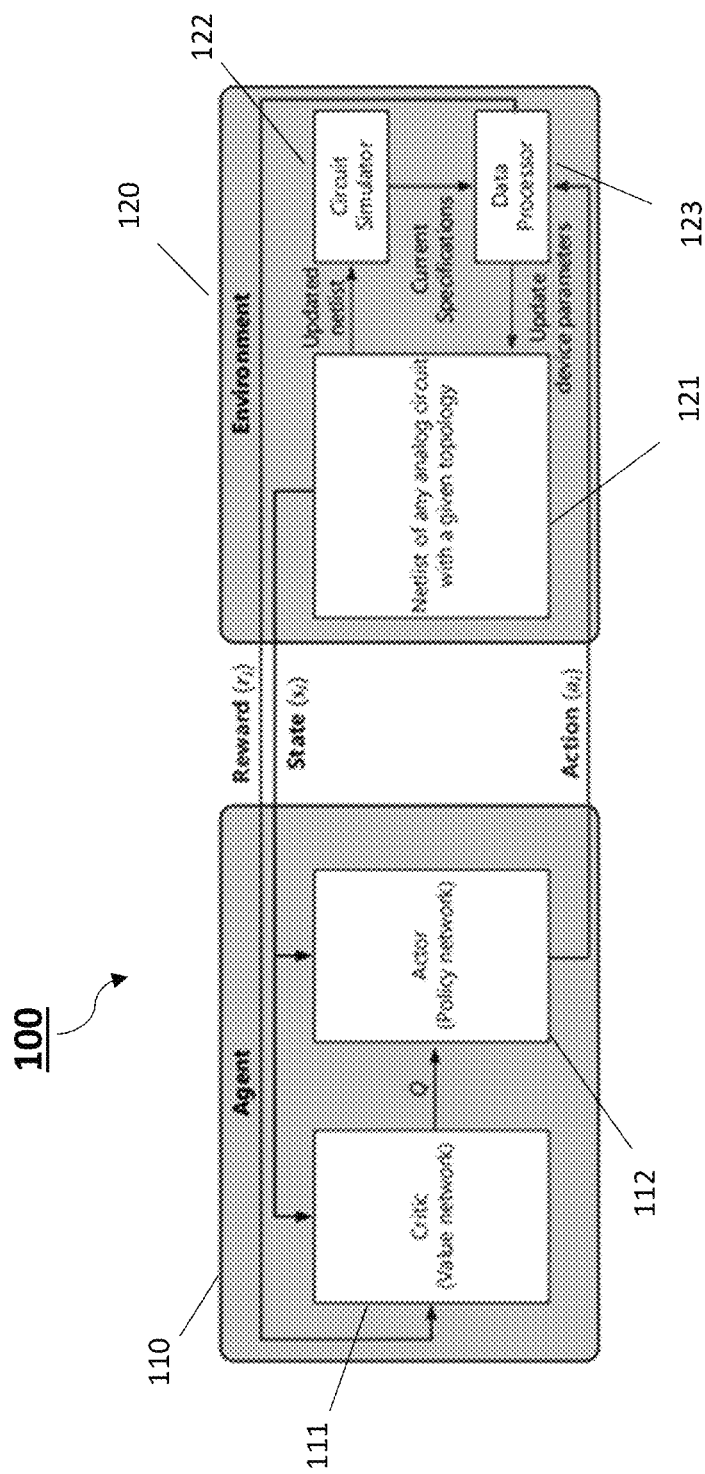
FIG. 1 is a schematic diagram illustrating an overview of the RL framework for automated design of analog circuits, according to embodiments of the present invention.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Design automation of analog/RF circuits can be best formulated as a parameter-to-specification (P2S) optimization problem. The goal is to find the optimal device parameters (e.g., width and length of transistors) to meet the desired circuitry specifications (e.g., power, speed, and bandwidth). Conventionally, these device parameters are manually derived based on the experiences and knowledge of IC designers about the circuits. Such empirical approaches aim to connect the circuitry specifications and the device parameters with equations through simplified physical models of devices and circuits. Hand-crafting those equations is labour-intensive due to the highly nonlinear properties of analog/RF circuits. Tens of iterations are also required to guarantee the design accuracy.

Various design automation techniques have been proposed for the P2S optimization problem of analog circuits, which generally fall into two categories: optimization-based methods and learning-based methods. Bayesian Optimization, Geometric Programming, Genetic Algorithms, and Simulated Annealing are the representative optimization-based methods. For all these methods, the search for optimal device parameters is guided by the algorithms. At each step, the intermediate circuit specifications obtained from standard simulators are compared with the design goals. The algorithms then decide how to update the device parameters for the next search. These approaches differ from each other in sampling efficiency, convergence rate, and global optimality. However, the key issue is that they have to re-start algorithms from scratch if any change of the desired specifications is made. The method in this current invention can reach different target specifications without systematic re-training.

Learning-based methods have emerged recently. Supervised learning methods have been used to learn the complicated relations between device parameters and circuit specifications. For example, an FCNN is trained to design two-stage operational amplifiers (Op-Amps), where the inputs of the network are circuit specifications and the outputs are predicted device parameters. These methods can not guarantee the design accuracy due to the inherent approximation errors. RL methods have been used to learn an optimal policy from the state space of desired specifications to the action space of device parameters. They can achieve high design accuracy if enough explorations are performed during the training phase. For example, the RL method can find optimal device parameters to fulfill desired specifications for two-stage Op-Amps with higher than 90% accuracy after exploring $3 \times 10^4$ environment steps.

These learning-based methods seldom consider the domain knowledge (i.e., topologies of circuits and couplings of specifications) that dominate the relations between device parameters and circuit specifications. Supervised learning methods use FCNNs to learn the static mapping between desired specifications and device parameters without resorting to the circuit topology. Similarly, RL methods use a simple FCNN as the policy network, ignoring the circuit graph and specification couplings. Another RL method builds its policy network upon a graph convolutional network (GCN) and solves a different problem, i.e., optimizing the figure-of-merit (FoM) of circuits. Nonetheless, it neglects the couplings of circuit specifications and the GCN only captures a circuit topology without any power supply and basis nodes which are an essential part of a circuit graph. Without delving into the graph nature of circuits, these methods are limited to design low-frequency analog circuits, e.g., Op-Amps. The key reason is that electromagnetic couplings of devices in RF circuits strongly depend on the topologies of circuits and notably affect the specifications.

Additionally, these learning-based methods only focus on designing CMOS circuits. This limitation is caused by that technology-dependent features of CMOS devices, such as saturation voltage and bulk voltage, are used to encode the state vector of a transistor, which however is not applicable for all semiconductor technologies. For example, GaN is a III/V semiconductor and possesses different device models with CMOS. The method described in this invention incorporates the domain knowledge of analog circuit design and achieves the design automation of a broad range of analog circuits (including both low-frequency analog circuits and RF circuits) implemented with different semiconductor technologies (including CMOS and GaN) by using technology-independent features to encode the state of devices.

Despite their great promise, existing best-performing ML approaches treat the P2S optimization as a black box without considering practical yet very important interrelations between device parameters and circuit specifications, severely limiting their robustness, accuracy, and efficiency. Additionally, these ML methods are confined to a very narrow scope of low-frequency analog circuits (i.e., operational-amplifiers) implemented with conventional complementary metal-oxide-semiconductor (CMOS) technology. They are not readily applicable to other types of analog circuits designed with different semiconductor technologies.

The method in this invention is inspired by human design philosophy and can comprehensively refine the complicated relations between device parameters and circuit specifications with the combination of GNN and FCNN. None of prior parts embrace these practical design considerations and achieve the ability as ours. Autockt [Setalluri et. al., 2020] uses a simple FCNN to design its policy network with device parameters and desired specifications as inputs, which ignores the graph nature of circuits and the couplings of specifications. GCN-RL circuit designer builds its policy network upon a circuit topology-based graph convolutional network (GCN) to optimize the figure-of-merit (FoM) of a given circuit. However, the GCN only partially captures the circuit topology without considering power supply nodes, which in fact are an essential part of a circuit graph. It also neglects the couplings of circuit specifications. Additionally, the present invention aims to achieve the design automation of a broad range of analog circuits (including both low-frequency analog circuits and RF circuits) implemented with different semiconductor technologies (including CMOS and GaN) by using technology-independent features to encode the state of devices.

Learning with Graph Neural Networks

Graph neural networks, such as graph convolutional network (GCN) and graph attention network (GAT), are emerging neural networks directly operating on non-Euclidean data structure resembling graphs. They have gained increasing popularity in various domains, including social network, knowledge graph, recommendation system, and life science. Our current invention harnesses GCN and GAT to capture the physics of a given circuit, e.g., devices' parameters, connections, and interactions, for our policy network. We show that a GAT with multi-head attention mechanism can better model the subtle physics of circuits than a GCN.

Problem Statement

In the present disclosure, we target the design automation of analog circuits at the pre-layout level, in which the goal is to efficiently search for optimal device parameters to meet the desired specifications. We are handling the scenarios where the topology of an analog circuit is fixed. This is practical, as many classical topologies are usually available for a given design task.

Overview of the current invention of RL framework for automated design of analog circuits is as following. The RL agent is based on the actor-critic method. The environment consists of a netlist of any analog circuit with a given topology, a circuit simulator, and a data processor. At each time step i, the agent automatically outputs the action $a_i$ to update device parameters according to the state $s_i$ and the reward $r_i$ from the environment.

Reinforcement Learning Framework

Some embodiments use a deep Reinforcement Learning (RL) approach to achieving design automation of analog circuits. Some embodiments of the present invention can provide a computer-implemented method for generating device parameters of circuits using a pretrained reinforcement learning (RL) agent composed of a graph neural network (GNN) and a fully connected neural network (FCNN). The method uses a processor coupled with a memory storing instructions implementing the method. The memory is configured to store the pretrained RL agent, the GNN and the FCNN. The instructions, when executed by the processor, carry out at steps of the method, include acquiring, via an interface, inputs with respect to a set of desired specifications or one desired specification of a circuit, device parameters, a fixed topology of the circuit and providing the inputs to the RL agent, wherein the desired circuit description includes a graph modeling the topology of the circuit and device parameters of the circuit, wherein the desired specifications include gain, bandwidth, phase margin, power consumption, output power and power efficiency. For instance, the pretrained RL agent is configured to perform steps of transmitting an action selected from a set of actions to an environment module, updating the device parameters of the circuit with respect to a circuit desired specification according to the selected action using a data processor of the environment module, wherein the action changes each of current device parameters by a minimum unit value of each device parameter, obtaining a current specification of the circuit by simulating a netlist of the circuit based on the updated device parameters using a circuit simulator of the environment module, wherein the environment module includes the netlist of the circuit, acquiring a reward from the environment module, wherein the reward is computed based on a difference between the current specification and the desired specification, wherein the steps of the transmitting, updating, obtaining and acquiring are continued until the reward reaches to a threshold value or a number of steps reach a preset value; and generating the updated device parameters of the circuit.

Figure 11:
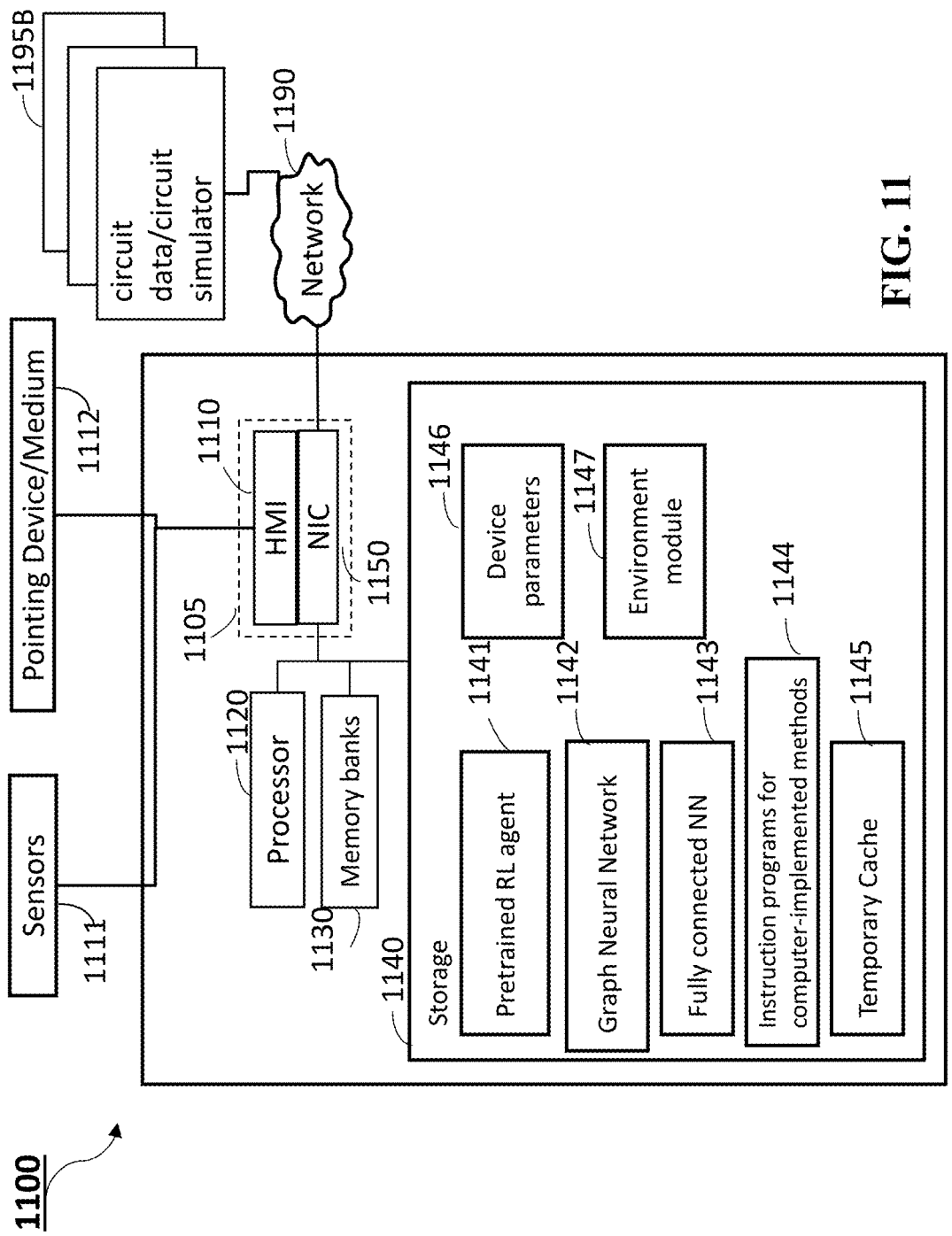
FIG. 11 shows a schematic of the system configured with processor, memory storing computer-implemented methods, and interface, according to embodiments of the present disclosure.

In addition, a computer-implemented method (computer-implemented RL agent training method) is provided for training a RL agent network generating device parameters of circuits. The method uses a processor coupled with a memory storing instructions implementing the method. The memory is configured to store the RL agent network. In this case, the processor is configured to perform the instructions that include steps of acquiring inputs with respect to a desired circuit specification of a circuit, a device parameter, a fixed topology of the circuit, a final state corresponding to a maximum step. The desired circuit specification includes a gain, bandwidth, phase margin, power consumption, output power and power efficiency. The RL agent network is configured to perform steps of transmitting an action selected from a set of actions to an environment module, updating the device parameters of the circuit with respect to a circuit specification according to the selected action using a data processor of the environment module, and the action changes each of current device parameters by a minimum unit value of each device parameter. The steps further include obtaining a current specification of the circuit by simulating a netlist of the circuit based on the updated device parameters using a circuit simulator of the environment module, wherein the environment module includes the netlist of the circuit, acquiring a reward from the environment module, wherein the reword is computed based on a difference between the current specification and the desired specification, wherein the steps of the transmitting, updating, obtaining and acquiring are continued until the reward reaches to a threshold value or a number of steps reach a preset value, and generating the satisfied updated device parameters via the interface. Some specific examples of a system are also illustrated in FIG. 11 according to the present invention.

FIG. 1 illustrates the framework 100 which consists of five key elements: Agent 110: the learner and the decision maker (in our case, it is the policy 112 and value network 111). Action spaces: a set of actions that can be taken (i.e., increasing, decreasing, or keeping the parameters of each device) by the agent 110. State spaces: a set of possible states where the agent 110 can stay in the environment 120 (i.e., any combination of device parameters for the circuit in the design space). Reward: a scalar value returned by the environment 120 for taking an action in a state (e.g., the difference between current specifications and the desired specifications). It is used to evaluate and guide the actual behavior of the agent. Environment 120: the physical world in which the agent operates (i.e., high-fidelity circuit simulation environment 122). A data processor unit 123 is also included in the environment. A netlist of a given analog circuit 121 is used as input for circuit simulator 122. The parameters of circuit in design is updated by the instruction of Action after data processor unit.

In out setting, for each episode, the circuit design starts from initial device parameters at the initial state $s_0$, given by a group of randomly sampled desired specifications. The final state $s_T$ corresponds to a completion of an episode, where T is the predetermined maximum step-length of each episode. At each time step i, the agent begins at state $s_i$, takes action $a_i$, arrives at a new state $s_{i+1}$ and receives a reward r from the environment, and the action can simultaneously update all device parameters for the given circuit. The agent iterates through the episode with multiple steps and accumulates the reward at each step until the goal is met or the total of T steps is reached. Next, we define the reward r, action a, state s, and the policy network architecture $\pi_\theta(a|s)$ parameterized by $\theta$, and finally the optimization method that we use to train these parameters.

Reward Function

We define the immediate reward $r_i$ at each time step i according to the weighted normalized difference between the current specifications $g_i$ and the desired specifications $g_*$:

$$r_i = \begin{cases} r, & \text{if } r < 0; \\ 10, & \text{if } r = 0 \end{cases}. \tag{1}$$

Here, r is expressed as $$r = \sum_{j=0}^{N-1} \min\left\{\frac{g_i^j - g_*^j}{g_i^j + g_*^j}, 0\right\} \quad (2)$$

The same weight is assigned to each normalized difference as all N desired specifications are equally important, but not necessary. Designer can also assign different weights for different specifications, $$r = \sum_{j=0}^{N-1} w_j * \min\left\{\frac{g_i^j - g_*^j}{g_i^j + g_*^j}, 0\right\} \quad (3)$$

Where $w_j$ is the assigned weighting factor for each different specification. Higher value of weight indicates a more important factor to consider in the overall design objectives.

The high bound of r is set to be 0 because one does not want to over-optimize the parameters once the current specifications reach the desired ones. We also give a large reward (i.e., 10) if the design goals are reached at some step (where the episode is also terminated). The episode reward of a search of optimal device parameters for the given goals g, starting from state s, is the accumulated reward from all steps:

$$R_{s,g} = \sum_{i=0} r_i. \quad (4)$$

Note that current specifications $g_i$ are obtained from our simulation environment based on the updated device parameters at time step i. Therefore, our reward is a direct and exact measurement from the high-fidelity professional circuit simulator 122, which can help to train the policy network with high quality.

Action Representation

For each optimal parameter x of a device (e.g., width and finger number of transistors), there are three possible actions: increasing (x+Δx), keeping (x+0), or decreasing (x−Δx) the parameter, where "Δx" is the smallest unit used to update the parameter within its bound [$x_{min}$, $x_{max}$]. With total M device parameters, the output of the policy network is an M×3 probability distribution matrix (each row corresponding to a parameter) at any state. The action is the argmax of this probability distribution along the row.

Figure 2:
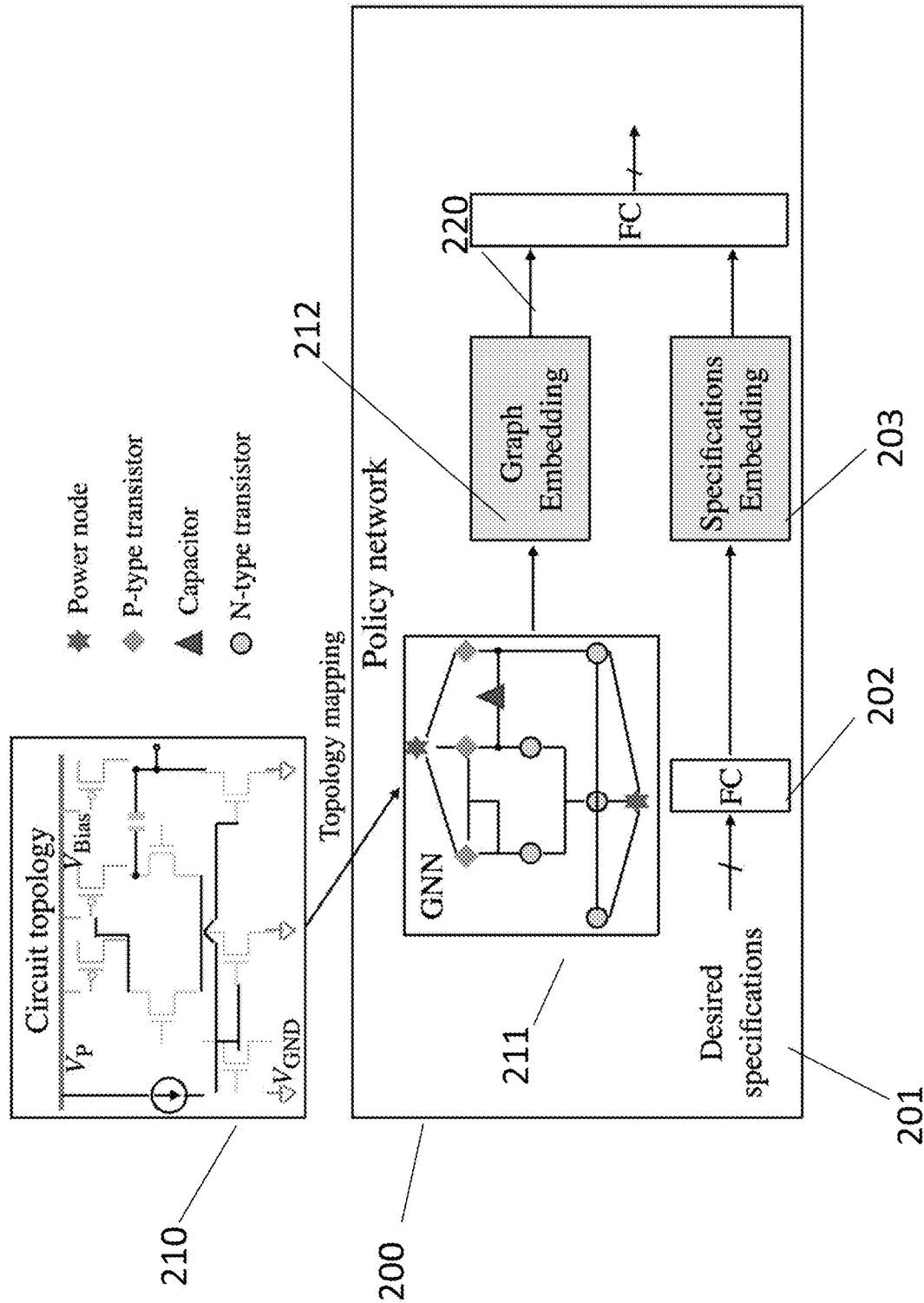
FIG. 2 is a schematic diagram illustrating a mapping of a circuit topology into a graph and illustrating a tailored GNN-FC-based policy network architecture for the analog circuit design, according to embodiments of the present invention.

FIG. 2 shows a schematic diagram illustrating a mapping of a circuit topology into a graph and illustrating a tailored GNN-FC-based policy network architecture for the analog circuit design according to some embodiments of the present invention. The figure illustrates mapping a circuit topology 210 into a graph neural network (GNN) 211 and illustrating a tailored GNN-FC-based policy network 200 architecture for the analog circuit design. Here, we use a two-stage Op-Amp as an example, as illustrated in 210.

State Representation

At each step of an episode, our state contains information about the circuit itself and the desired goals. As shown in FIG. 2, we use a graph G(V,E) 211 to model the circuit based on its topology 210, where each node (V) is a device and the connection between devices is an edge (E). In addition, we treat the power supply ($V_P$) and ground ($V_{GND}$) as two extra nodes. For a circuit with n devices, the state for the $k^{th}$ device is its node feature defined as $s_k$=(t,$\vec{p}$). Here, t is the binary representation of the device type and $\vec{p}$ is the parameter vector of the device. For transistors, the parameters are the width ($x_w$) and the finger number ($x_F$) while for capacitors, resistors, and inductors, the parameter is the scalar value of each device. The parameter for power supply is a voltage of $V_P$ (0 for $V_{GND}$) in 210. Zero padding is used to ensure that the length of $\vec{p}$ for each device is the same. For a circuit with five different types of devices and two power nodes, the state of an N-type transistor is [0, 0, 1, $x_w$, $x_F$]. The desired specifications are also used as a part of our state. We create a vector to represent them. For example, to design an Op-Amp, the state vector of specifications is expressed as [G,B,PM,P]201 which are gain, bandwidth, phase margin, and power consumption, respectively.

Environment and Agent

Our environment 120 consists of the netlist 121 of the given circuit, a high-fidelity circuit simulator 122 (such as Cadence Spectre or Advanced Design system (ADS)), and a data processor 123. The circuit simulator is used to simulate the netlist to obtain the current specifications of the circuit. The data processor 123 then deals with the simulated results to feed back a reward to the agent 110. It also updates the device parameters to rewrite the circuit netlist 121 according to the actions from the agent 110.

We use an actor-critic method which has Critic (111) and Actor blocks (112) to build the agent 110. In order to train an agent that can accurately optimize the device parameters to meet the desired specifications 201, we propose a neural network architecture for the policy network 200 as shown in FIG. 2, which consists of a graph neural network (GNN) 211 and a fully connected neural network (FCNN) 202. We term it GNN-FC-based policy network, where the role of the GNN 211 is to distill physical information about the type and connectivity of a node within a circuit graph into low-dimensional vector embeddings 212. In particular, we use a graph convolutional network to extract such physical features. We also use an FCNN 202 that takes the design goals and embedded in 203 as inputs to extract their coupled relations, e.g., design trade-offs between different specifications. The graph embedding 212 and the FCNN embedding 203 are then concatenated and further processed by the final FC layer 220 to update the actions. The value network 111 preserves the same architecture as the policy network 112 except of the last layer, which outputs an estimation of the expected reward for the current policy execution.

Our goal is to make the RL agent (i.e., the policy network 112) generate higher-quality decisions as it gains experience from searching for optimal device parameters, associated with desired specifications. We can formally define the objective function of the automated design of analog circuits as $$J(\theta, G) = \frac{1}{H} \sum_{g: G} E_{g,s: \pi_\theta}[R_{s,g}]. \quad (5)$$

Here, H is the space size of all desired specifications G and R is the episode reward defined in Eq. (3). Given the cumulative reward for each episode, we use Proximal Policy Optimization (PPO) to update the parameters of the policy network with a clipped objective as shown below:

$$L^{CLIP}(\theta) = \hat{E}_i[\min(b_i(\theta), \text{clip}(b_i(\theta), 1-\epsilon, 1+\epsilon))\hat{A}_i], \quad (6)$$

where $\hat{E}_i$ represents the expected value at time step i; $b_i$ is the probability ratio of the new policy and the old policy, and $\hat{A}_i$ is the estimated advantage at time step i.

Example Designs

Two representatives of analog circuits are used to evaluate the proposed RL framework. First, we select the two-stage Op-Amp in FIG. 2 as an exemplary low-frequency analog circuit because it is taken as a standard benchmark by lots of optimization-based methods and learning-based methods. The Op-Amp is implemented in a 45 nm CMOS technology.

Figure 3A:
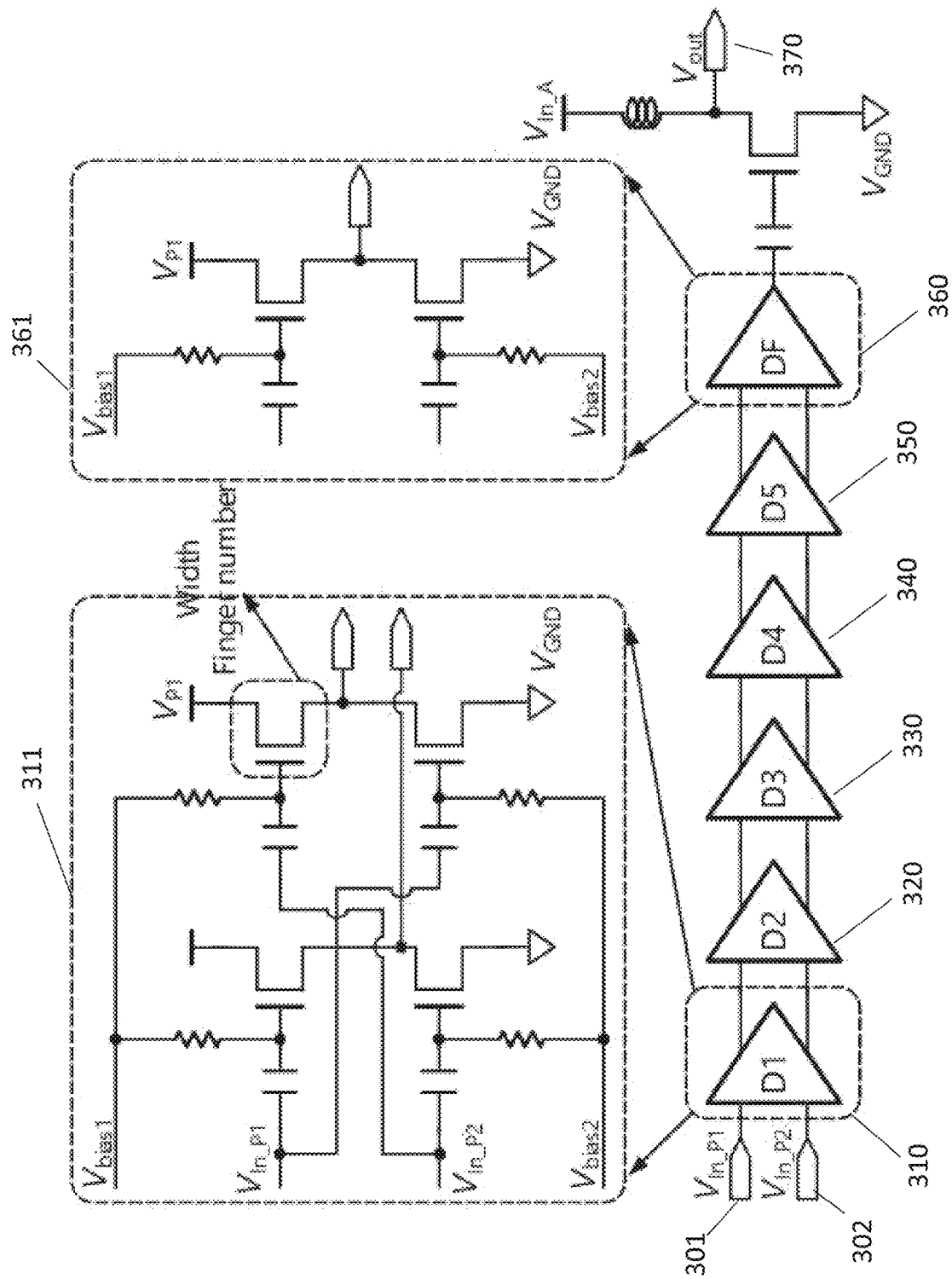
FIG. 3A shows a schematic of a RF polar-TX in 150 nm GaN technology. D1~D5 and DF are the driver stage, according to embodiments of the present invention.

Second, we choose a RF polar transmitter (polar-TX) shown in FIG. 3A as an example of high-frequency analog circuits, which is implemented in a 150 nm GaN technology. The polar-TX consists of 5 stages of drivers D1, D2, D3, D4, and D5 as noted by 310, 320, 330, 340, 350, and a final stage DF 360, which is explained in the details shown in a circuit diagram 361. A circuit diagram 311 shows the schematic of the driver stage, which is has the same topology for D1-D5. The input is differential signal $V_{in\_p1}$ 301 and $V_{in\_p2}$ 302. The output port is Vout 370.

The design space of device parameters and the sampling space of desired specifications for the two circuits are listed in FIG. 3B. There are total 15 and 14 parameters for the two-stage Op-Amp and RF polar-TX respectively. Note that: 1) two transistors in a differential pair of the Op-Amp have exactly the same parameters; 2) the devices in each driver stage D1-D5 of the RF polar-TX also preserve the same parameters. These are practical constraints imposed by the circuit design.

We train separate RL agents (110) to enable the automated design of each circuit. In our experiments, each training of the two-stage Op-Amp takes about 3 CPU hours while each training of the RF polar-TX costs about 12 CPU hours. RF circuits require more sophisticated simulations and thus more time is needed to acquire the training rewards. In order to show the unique advantage of our GNN-FC-based policy network, we use an FCNN-based policy network as a baseline which does not consider the physical topology of the circuit. All our experiments are performed on an 8-core Intel CPU.

Agent Training

Figure 4A:
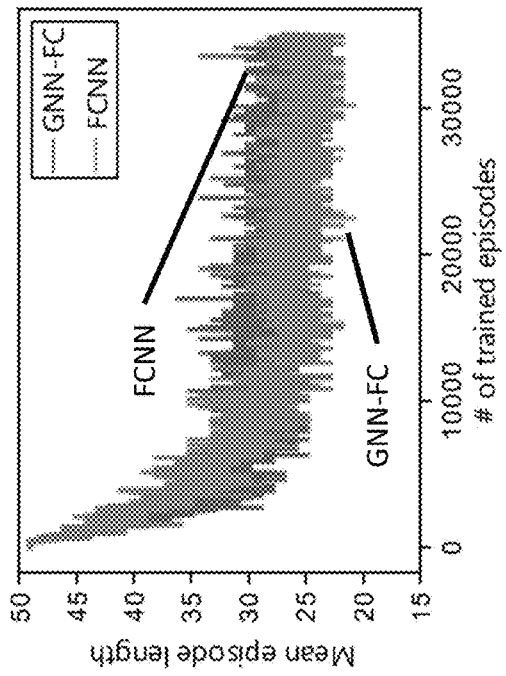
FIGS. 4A, 4B and 4C show the evolution of the mean episode reward, the mean episode length, and the deployment accuracy of RL agents, according to embodiments of the present invention.
Figure 4B:
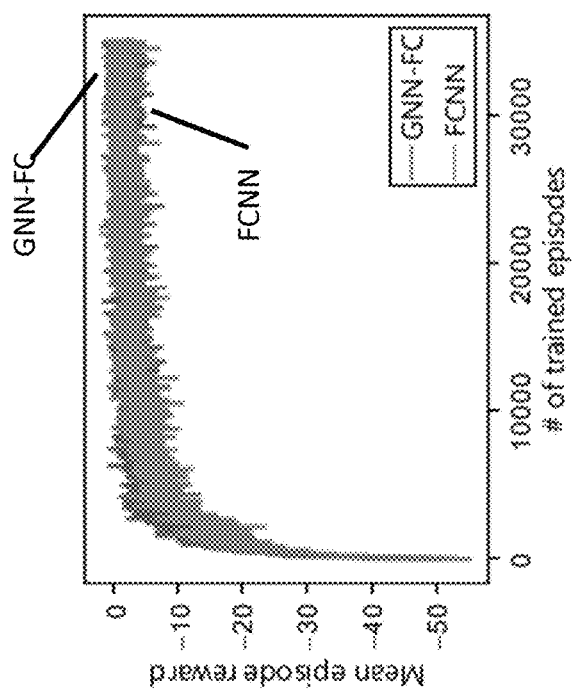
Figure 4C:
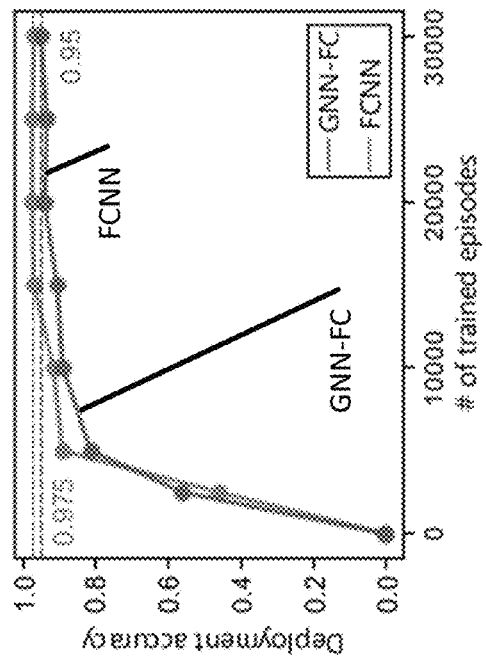

The episode length for the two-stage Op-Amp RL agent (the polar-TX RL agent) is set to be 50 (30). The total episodes used to train the two RL agents are chosen to be $3.5 \cdot 10^4$ and $3.5 \cdot 10^3$, respectively. RF polar-TX has less device parameters, fewer target specifications, and smaller design space, thereby requiring less episodes for training. FIG. 4A, FIG. 4B and FIG. 4C show the curves of mean episode reward mean episode length, and deployment accuracy of RL agent with different policy network architectures for design two-stage Op-Amp during the training, respectively.

Figure 5B:
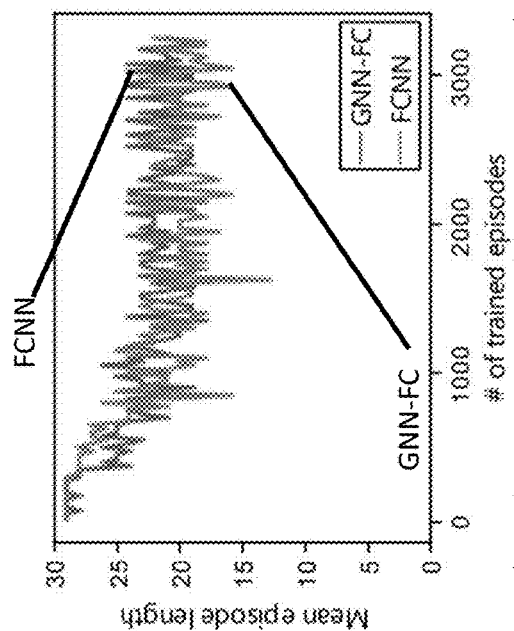
FIGS. 5A, 5B and 5C show the evolution of the mean episode reward, the mean episode length, and the deployment accuracy of RL agents, according to embodiments of the present invention.
Figure 5A:
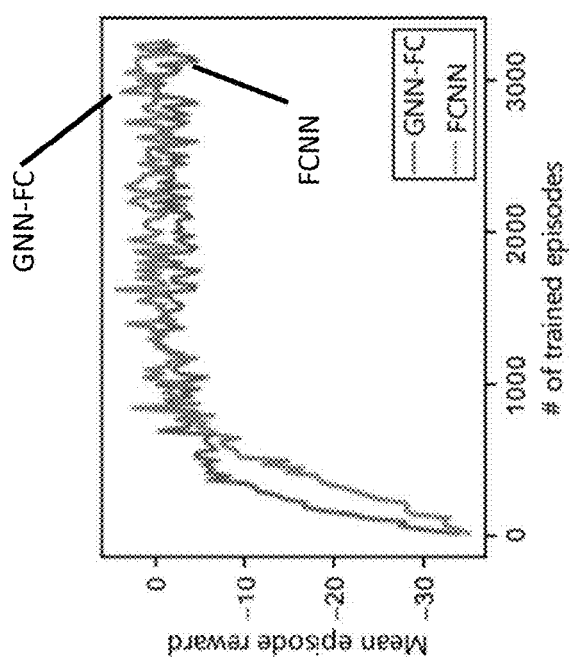
Figure 5C:
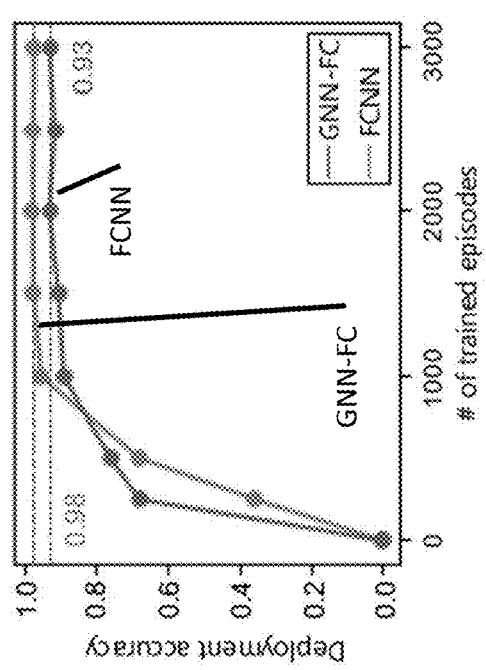
Figure 6A:
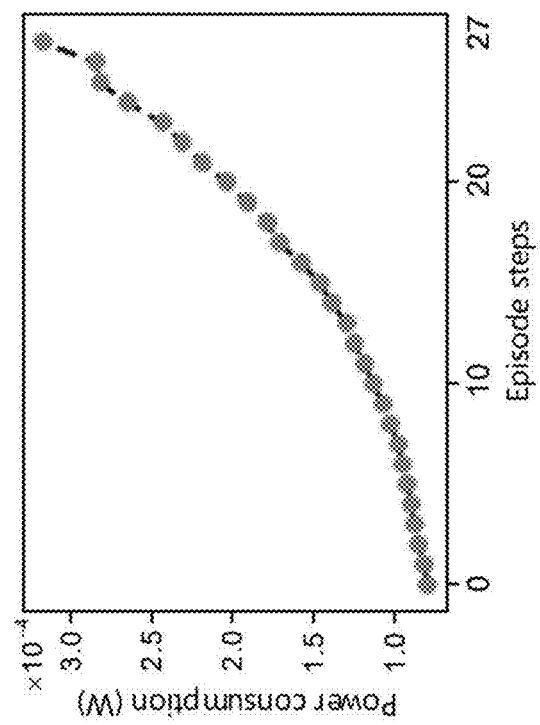
FIGS. 6A, 6B, 6C and 6D show the deployment examples of the trained RL agent attempting to reach one group of the target specifications for one circuit in design according to embodiments of the present invention.
Figure 6B:
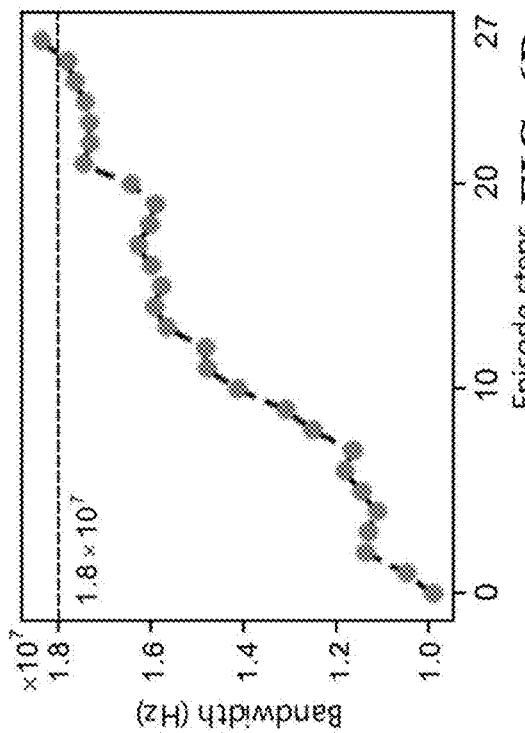
Figure 6C:
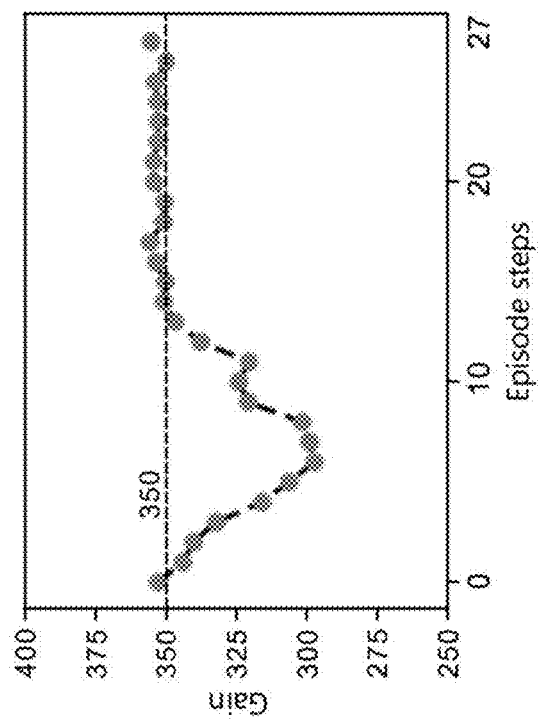
Figure 6D:
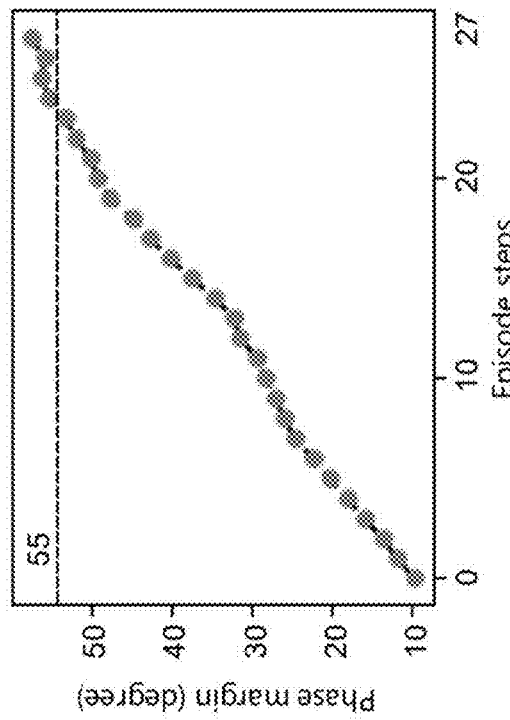

FIG. 5A, FIG. 5B, and FIG. 5C show the curves of mean episode reward mean episode length, and deployment accuracy of RL agent with different policy network architectures for design the polar-TX during the training, respectively.

As observed from FIGS. 4A and 5A, the mean episode reward obtained from each policy network gets higher as more episodes are used for training. However, the proposed GNN-FC-based policy network is capable to achieve higher reward than the normal FCNN-based policy network. The mean episode length 4B and 5B of each policy network also decreases over the training episodes. Our policy network shows a shorter (faster) mean episode length compared to the baseline policy network. We also show the deployment accuracy 4C and 5C of the two policy networks over the training episodes. Policy deployment means that we apply the trained policy network to automatically find the device parameters for given desired specifications. Each point in the right column of FIGS. 4C and 5C is obtained from the statistics of deploying each policy network for 200 groups of randomly sampled desired specifications. The comparison exhibits that the proposed GNN-FC-based policy network has higher deployment accuracy than the baseline FCNN-based policy network for both circuits design. Our policy network achieves state-of-the-art 97.5% policy deployment accuracy. These results suggest that the proposed GNN-FC-based policy network combining both physical circuits features, via the GNN part, and the couplings between design specifications, via the FC part, is more efficient and accurate for analog circuits design.

Automated Circuit Design with Policy Deployment

Figure 7A:
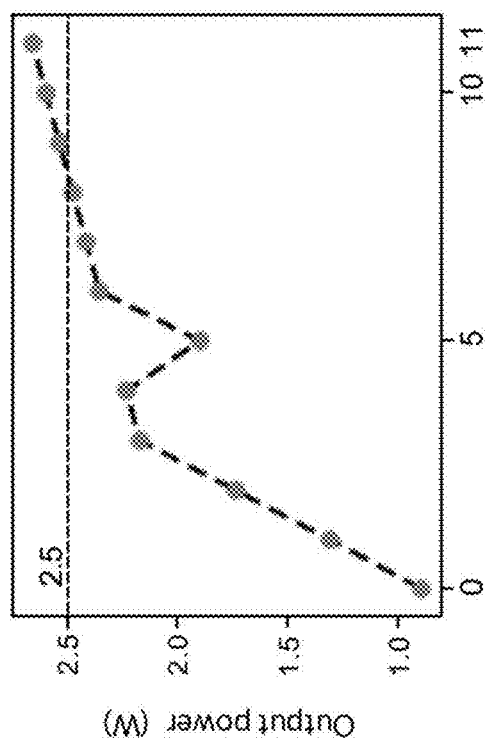
FIG. 7A and FIG. 7B show the deployment examples of the trained RL agent attempting to reach one group of the target specifications for one circuit in design according to embodiments of the present invention.
Figure 7B:
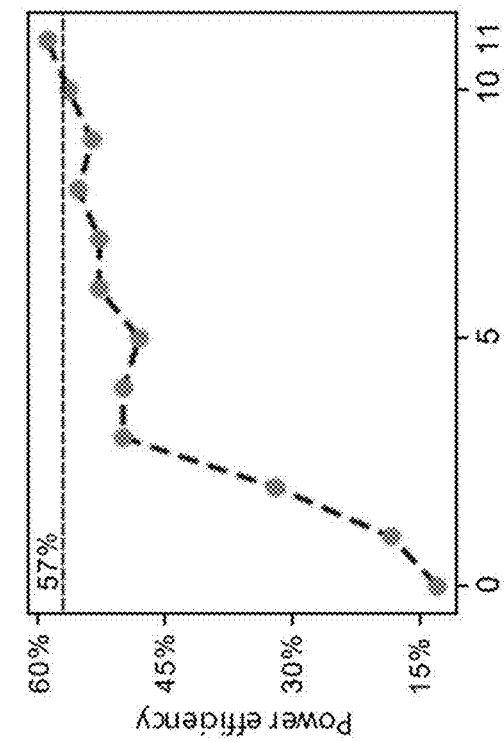
Figure 8A:
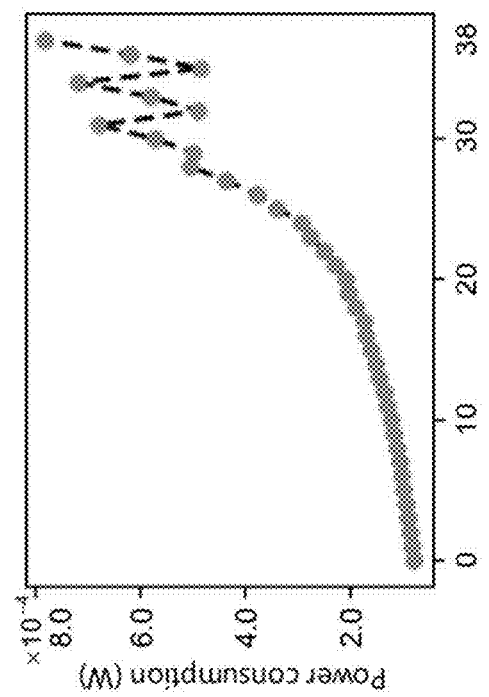
FIG. 8A, FIG. 8B, FIG. 8C and FIG. 8D show generalization examples of the trained RL agent attempting to reach one group of the unseen new specifications for one circuit in design, according to embodiments of the present invention.
Figure 8B:
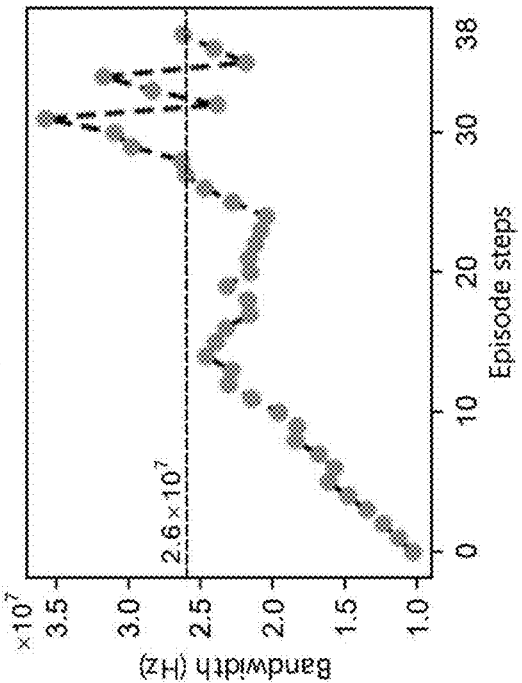
Figure 8C:
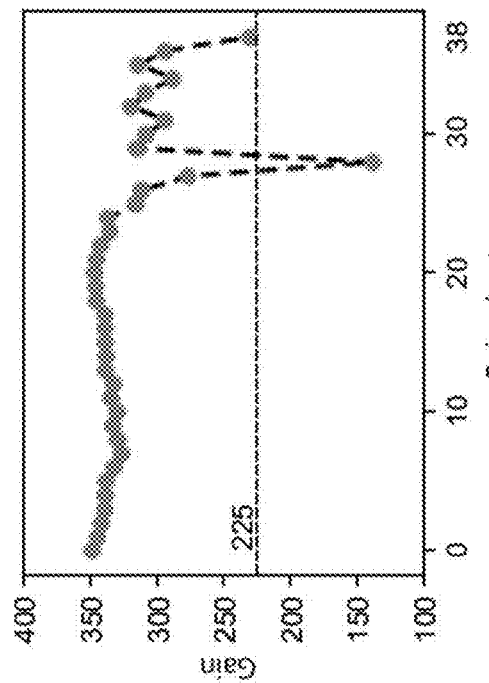
Figure 8D:
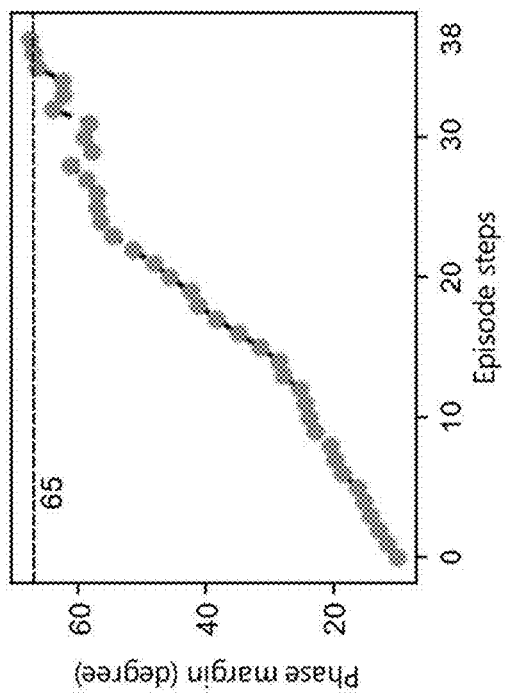

We deploy the GNN-FC-based policy network trained with the predefined total episodes ($3.5 \cdot 10^4$ for the two-stage Op-Amp and $3.5 \cdot 10^3$ for the polar-TX) to show how it is applied for analog circuit design automation. FIGS. 6A, 6B, 6C, and 6D illustrate such an example of two-stage Op-Amp, where the RL agent automatically seeks for the optimal device parameters from the initial state (step 0) for the circuit with a group of randomly sampled desired specifications. The sampled desired specifications for the two-stage Op-Amp are gain (G=350) in FIG. 6A, power consumption (P=$4 \cdot 10^{-3}$ W) in FIG. 6B, phase margin (PM=55°) in FIG. 6C, and bandwidth (B=$1.8 \cdot 10^7$ Hz) in FIG. 6D. Note that the smaller the power consumption is, the better the performance is. As shown in FIGS. 7A and 7B, The sampled desired specifications for the RF polar-TX are output power (P=2.5 W), and power efficiency (E=57%). These sampled specifications are represented by the horizontal dashed lines in FIGS. 6A-6D and FIGS. 7A and 7B. We observe that at the initial state, the current specifications (y-axis of each sub-figure) generally deviate a lot from the desired ones. As the deployment continues, the RL agent follows the path guided by the trained policy to find the optimal device parameters for the given specifications and hence the current specifications get closer to the desired ones. The RL agent needs 27 steps and 11 steps to achieve the design goals for each circuit.

An interesting phenomenon here is that when some specification is first achieved, the RL agent will not over-optimize it too much but try to optimize those not yet reached. For example, the gain of the two-stage Op-Amp is first attained at the $14^{th}$ deployment step. In the following steps, the RL agent focuses on optimizing the specifications that have not been realized, i.e., phase margin and bandwidth. Similarly, for the deployment of the RF polar-TX, the output power is first reached and the RL agent then continues to optimize the power efficiency. Such a property enabled by RL method is very promising, because the classical manual tuning lacks the ability to well balance the trade-offs between all the desired specifications during the optimization. We also analyze a few failed cases in which our trained policy cannot converge to the optimal device parameters. We observe that in these cases, some specifications are able to converge to a neighborhood of the desired ones, but after which they deviate a bit from the goal. Fortunately, we find that by slightly tuning the device parameters with manual effort at that particular step, the design goal is also easily achieved. These results suggest that IC designers can still greatly benefit from the trained policy, if used as an efficient warm-start of the manual tuning, even if an automated deployment fails. A detailed analysis and further results demonstration can be found in supplementary material.

Generalization to Unseen Specifications

In addition, we evaluate the generalization ability of the GNN-FC-based policy network, that is we apply it for the deployment with unseen specifications that are out of the sampling space listed in FIG. 3B. The group of sampled unseen specifications for the two-stage Op-Amp are: gain (G=225), bandwidth (B=2.6·10$^7$ Hz), phase margin (PM=65°), power consumption (P=6·10$^{-3}$ W). As for the RF polar-TX, they are: output power (P=2.9 W), and power efficiency (E=69%). FIGS. 8A-8D and FIGS. 9A and 9B show the deployment trajectories, where the horizontal dashed lines denote these unseen specifications. Compared to the policy deployment in FIGS. 6A-6D and FIGS. 7A and 7B, where the specifications are sampled from the training space in FIG. 3A, the deployment to the unseen desired specifications usually requires more search steps. For example, the generalization for the RF polar-TX needs 49 steps to achieve the goals while 11 steps are enough for the normal deployment of RF polar-TX in FIGS. 7A and 7B. This difference is due to the fact that the unseen desired specifications are beyond the scope of the training datasets, thereby demanding more steps to reach the optimal parameters. However, we find that the baseline FCNN-based policy network is lack of such generalizing ability for most unseen specifications even with higher number of search steps. The generalization of our proposed policy network is attributed to the fact that it is capable to capture the rich representations (e.g., physical topology and coupling relations between specifications) of the state space, hence can leverage the learned experiences from previous states to the new unseen states at the inference time.

Comparison with Other Methods

We finally compare the efficiency of our method with previous optimal tuning methods. FIG. 10 lists the comparison results. Our RL method in the deployment phase (inference stage) is superior to the Bayesian Optimization. Bayesian Optimization generally needs 5× more steps compared to our method to find the optimal device parameters for the same desired specifications. Compared to the previous RL method (K. Settaluri, A. Haj-Ali, Q. Huang, K. Hakhamaneshi, and B. Nikolic. AutoCkt: Deep Reinforcement Learning of Analog Circuit Designs. In 2020 *Design, Automation & Test in Europe Conference Exhibition (DATE)*, pages 490-495, 2020.), our method is also more efficient with less deployment steps due to the unique policy network architecture. Lastly, our method has the generalization ability, which has not been demonstrated by other methods. In summary, the proposed method has shown advancement in efficiency, accuracy, and generalization.

We also compare our method with another work (H. Wang, K. Wang, J. Yang, L. Shen, N. Sun, H. S. Lee, and S. Han. GCN-RL Circuit Designer: Transferable Transistor Sizing with Graph Neural Networks and Reinforcement Learning. In 2020 57th *ACM/IEEE Design Automation Conference (DAC)*, pages 1-6, 2020.) in optimizing the figure-of-merit (FoM) of a two-stage operational-amplifier. The work is technically different with our work in many aspects, such as RL techniques (DDPG vs. PPO), state spaces (technology-dependent features of devices vs. technology-independent features of devices), and action spaces (continuous vs. discrete). For a fair comparison, we build this baseline with PPO technique and a discrete action space as done in our work, but use a GCN for its policy network and FoM as a reward function. In addition, we compare the accuracy between our method and the supervised learning method (not RL) in predicting device parameters with given specifications. For comparison, we first train an FCNN whose inputs are desired specifications and outputs are the corresponding device parameters. We then use it for prediction by giving random desired specifications and verify the correctness with circuit-level simulations. The comparison shows our method has a much higher accuracy (98% vs. 87%).

Accordingly, some embodiments of the present invention can provide a deep reinforcement learning (RL) based framework for the automated design of analog circuits. The key property of our framework is its ability to capture both the underlying physical topology of a given circuit and the trade-offs between specifications, into the newly proposed combined GNN-FC-based policy network. We showed that such a network architecture is superior to other network architectures, which mostly rely on the capture of physical features but fail to properly incorporate the relationship between the physical topology and the trade-offs of specifications. It can design both high-quality low-frequency circuits and RF circuits in different implementation technologies. In particularly, we show that it can speed up the design of RF circuits compared to conventionally optimization methods. Our framework also demonstrates a good generalization ability, i.e., generating optimal design parameters for unseen targets. We believe that our method can assist IC industry to accelerate the analog chip design, with artificial agents that could accumulate a massive circuitry optimization experiences via continuous training.

FIG. 11 shows a schematic of a system 1100 configured with processor 1120, memory 1120 coupled with a storage 1140 storing computer-implemented methods, and interface 1105 according to some embodiments of the present disclosure.

FIG. 11 illustrates a block diagram illustrating an example of a system 1100 for automated construction of an artificial neural network architecture, to some embodiments of the present disclosure. The system 1100 includes a set of interfaces and data links 1105 configured to receive and send signals, at least one processor 1120, a memory (or a set of memory banks) 1130 and a storage 1140. The processor 1120 performs, in connection with the memory 1130, computer-executable programs and algorithms stored in the storage 1140. The set of interfaces and data links 1105 may include a human machine interface (HMI) 1110 and a network interface controller 1150. The processor 1120 can perform the computer-executable programs and algorithms in connection with the memory 1130 that uploads the computer-executable programs and algorithms from the storage 1140. The computer-executable programs and algorithms stored in the storage 1140 may be a pretrained RL agent (neural network) 1141, a graph neural network 1142, fully connected neural network 1143, the instructions for performing computer-implemented method (programs) 1144, temporary caches 1145, device parameters 1146, and an environment module 1147.

The system 1100 can receive the signals via the set of interfaces and data links. The signals can be datasets of training data, desired circuit description data and testing data including gain, bandwidth, phase margin, power consumption, output power and power efficiency.

The at least one processor 1120 is configured to, in connection with the interface and the memory banks 1105, submit the signals and the datasets into the reconfigurable DNN blocks 1141. The system 1100 may receive circuit data or perform the circuit simulating with associated computing system 1195B via a network 1190 and the set of interfaces and data links 1105.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A computer-implemented method for generating device parameters of circuits using a pretrained reinforcement learning (RL) agent composed of a graph neural network (GNN) and a fully connected neural network (FCNN), wherein the method uses a processor coupled with a memory storing instructions implementing the method, wherein the instructions, when executed by the processor, carry out at steps of the method, comprising:
 acquiring, via an interface, inputs with respect to a set of desired specifications or one desired specification of a circuit, device parameters, a fixed topology of the circuit and providing the inputs to the RL agent, wherein the desired circuit description includes a graph modeling the topology of the circuit and device parameters of the circuit, wherein the desired specifications include gain, bandwidth, phase margin, power consumption, output power and power efficiency, wherein the pretrained RL agent is configured to perform steps of:
 transmitting an action selected from a set of actions to an environment module;
 updating the device parameters of the circuit with respect to a circuit desired specification according to the selected action using a data processor of the environment module, wherein the action changes each of current device parameters by a minimum unit value of each device parameter;
 obtaining a current specification of the circuit by simulating a netlist of the circuit based on the updated device parameters using a circuit simulator of the environment module, wherein the environment module includes the netlist of the circuit;
 acquiring a reward from the environment module, wherein the reward is computed based on a difference between the current specification and the desired specification, wherein the steps of the transmitting, updating, obtaining and acquiring are continued until the reward reaches to a threshold value or a number of steps reach a preset value; and
 generating the updated device parameters of the circuit.

2. The method of claim 1, wherein the circuit is modeled by a graph G(V, E), wherein each node V is represented by a device, wherein an edge E represents a connection between devices.

3. The method of claim 1, wherein the power supply (VP), ground (VGND), and other DC bias voltages in the circuit topology are represented as extra nodes V.

4. The method of claim 1, wherein the reward is calculated by a weighted sum of all desired specification by assigning different value of the weighting factor.

5. The method of claim 1, wherein the Graph Neural Network can be implemented by different types such as Graph Convolutional Network or Graph Attention Network (GNN).

6. The method of claim 1, wherein the FCNN embeds the desired specifications of the circuit, and GNN embeds the circuit topology and parameters.

7. A computer-implemented method for training a RL agent network generating device parameters of circuits, wherein the method uses a processor coupled with a memory storing instructions implementing the method, wherein the instructions, when executed by the processor, carry out at steps of the method, comprising:

acquiring inputs with respect to a desired circuit specification of a circuit, a device parameter, a fixed topology of the circuit, a final state corresponding to a maximum step, wherein the desired circuit specification includes a gain, bandwidth, phase margin, power consumption, output power and power efficiency, wherein the RL agent network is configured to perform steps of:

transmitting an action selected from a set of actions to an environment module;

updating the device parameters of the circuit with respect to a circuit specification according to the selected action using a data processor of the environment module, wherein the action changes each of current device parameters by a minimum unit value of each device parameter;

obtaining a current specification of the circuit by simulating a netlist of the circuit based on the updated device parameters using a circuit simulator of the environment module, wherein the environment module includes the netlist of the circuit;

acquiring a reward from the environment module, wherein the reword is computed based on a difference between the current specification and the desired specification, wherein the steps of the transmitting, updating, obtaining and acquiring are continued until the reward reaches to a threshold value or a number of steps reach a preset value; and generating the updated device parameters via the interface.

8. The method of claim 7, wherein the circuit is modeled by a graph $G(V, E)$, wherein each node V is represented by a device, wherein an edge E represents a connection between devices.

9. The method of claim 7, wherein the power supply (VP), ground (VGND), and other DC bias voltages in the circuit topology are represented as extra nodes V.

10. The method of claim 7, wherein the reward is calculated by a weighted sum of all desired specification by assigning different value of the weighting factor.

11. The method of claim 7, wherein the Graph Neural Network can be implemented by different types such as Graph Convolutional Network or Graph Attention Network (GNN).

12. The method of claim 7, wherein the FCNN embeds the desired specifications of the circuit, and GNN embeds the circuit topology and parameters.

\* \* \* \* \*